US012055409B2

United States Patent
Levin et al.

(10) Patent No.: US 12,055,409 B2
(45) Date of Patent: Aug. 6, 2024

(54) UNCONTROLLED INTERSECTION DETECTION AND WARNING SYSTEM

(71) Applicant: Uber Technologies, Inc., San Francisco, CA (US)

(72) Inventors: Ilia Levin, San Francisco, CA (US); Nina Pakhomova, San Mateo, CA (US); Mir Shahrouz Takyar, San Jose, CA (US); Yuqi Zhang, Burlingame, CA (US); Danni Lu, Foster City, CA (US)

(73) Assignee: Uber Technologies, Inc., San Francisco, CA (US)

( * ) Notice: Subject to any disclaimer, the term of this patent is extended or adjusted under 35 U.S.C. 154(b) by 43 days.

(21) Appl. No.: 17/660,336

(22) Filed: Apr. 22, 2022

(65) Prior Publication Data
US 2022/0341747 A1 Oct. 27, 2022

Related U.S. Application Data

(60) Provisional application No. 63/201,334, filed on Apr. 23, 2021.

(51) Int. Cl.
*G01C 21/36* (2006.01)
*G01C 21/34* (2006.01)
*G06N 20/00* (2019.01)

(52) U.S. Cl.
CPC ..... *G01C 21/3697* (2013.01); *G01C 21/3461* (2013.01); *G01C 21/3492* (2013.01); *G01C 21/3629* (2013.01); *G01C 21/3632* (2013.01); *G06N 20/00* (2019.01)

(58) Field of Classification Search
CPC ............ G01C 21/3697; G01C 21/3461; G01C 21/3492; G01C 21/3629; G01C 21/3632; G06N 20/00
See application file for complete search history.

(56) References Cited

U.S. PATENT DOCUMENTS

| | | | | |
|---|---|---|---|---|
| 8,694,241 | B1 * | 4/2014 | Kadous | G08G 1/0112 |
| | | | | 701/422 |
| 8,855,904 | B1 * | 10/2014 | Templeton | G08G 1/0141 |
| | | | | 701/119 |
| 10,807,610 | B1 * | 10/2020 | Katsuyama | G08G 1/091 |
| 11,170,138 | B2 * | 11/2021 | Stroila | G06F 30/20 |

(Continued)

*Primary Examiner* — James J Lee
*Assistant Examiner* — Steven Vu Nguyen
(74) *Attorney, Agent, or Firm* — Schwegman Lundberg & Woessner, P.A.

(57) ABSTRACT

Systems and methods are directed to detecting uncontrolled intersections and providing warnings. In response to a navigation request from a user device, the system generates a navigation route using integrated map data, whereby the integrated map data includes indications of uncontrolled intersections that comprise intersections where at least some of the traffic is not required to stop. The system causes presentation of the navigation route in a user interface on the user device and monitors navigation of a vehicle associated with the user device along the navigation route. If the system detects that the vehicle is approaching an uncontrolled intersection based on the monitoring and the integrated map data, the system causes presentation of a warning indicating the uncontrolled intersection in the user interface.

20 Claims, 9 Drawing Sheets

(56) References Cited

U.S. PATENT DOCUMENTS

| | | |
|---|---|---|
| 11,393,264 B1 * | 7/2022 | Nakashima .......... G07C 5/0816 |
| 2010/0207787 A1 * | 8/2010 | Catten .............. G08G 1/096716 |
| | | 340/905 |
| 2014/0257637 A1 * | 9/2014 | Sangameswaran ... B60W 30/09 |
| | | 701/1 |
| 2021/0304610 A1 * | 9/2021 | Rajagopal ................ G08G 1/04 |
| 2022/0237956 A1 * | 7/2022 | Kumar .................... B60Q 9/00 |

* cited by examiner

UNCONTROLLED INTERSECTION DETECTION AND WARNING SYSTEM

CROSS REFERENCE TO RELATED APPLICATIONS

This application claims priority to U.S. Provisional Patent Application No. 63/201,334, filed Apr. 23, 2021, and entitled "Uncontrolled Intersection Detection and Warning System." The contents of this prior application are considered part of this application and are hereby incorporated by reference in their entirety.

TECHNICAL FIELD

The subject matter disclosed herein generally relates to special-purpose machines configured for providing navigation instructions, and to the technologies by which such special-purpose machines become improved compared to other machines that provide navigation instructions. Specifically, the present disclosure addresses systems and methods that detect uncontrolled intersections and provides warnings when navigating towards the uncontrolled intersections.

BACKGROUND

About one-third of crashes occur at intersections. Cities use traffic control devices like signage and lights to coordinate traffic at intersections. However, many intersections are not fully controlled (e.g., vehicles on some approaches to intersections can pass through freely and are not required to stop). Such uncontrolled intersections create challenging conditions for drivers to navigate where they must be especially attentive and cautious. Drivers often navigate to streets and areas that they have never or seldom navigated to before, especially when using a navigation system. Navigating in unfamiliar territory may be stressful as the driver is trying to negotiate traffic while trying to ensure following a routeline provided by the navigation system. Adding road conditions to the mix (e.g., parked cars on the road, non-clear visibility to cross traffic, pedestrians) may cause even more stress for the drivers in various conditions which leads to safety issues.

BRIEF DESCRIPTION OF THE DRAWINGS

Some embodiments are illustrated by way of example and not limitation in the figures of the accompanying drawings.

DETAILED DESCRIPTION

Figure 1:
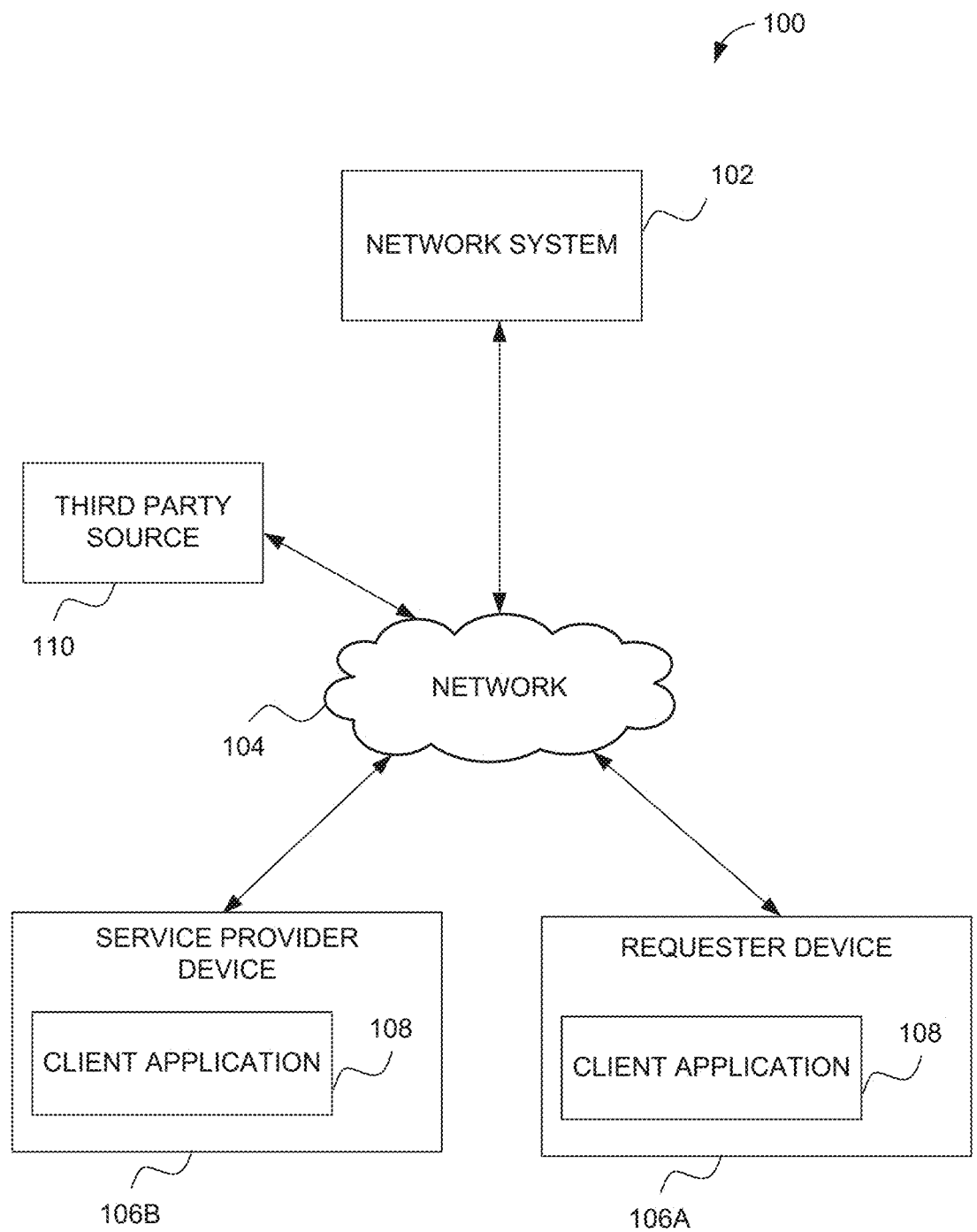
FIG. 1 is a diagram illustrating a network environment suitable for providing an uncontrolled intersection detection and warning system, according to example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Uncontrolled intersections can be problematic to drivers that do not know whether cross-traffic is required to stop. Uncontrolled intersections can include intersections with only a two-way stop sign, intersections with no stop signs, or any intersection where some of the traffic is not required to stop. Uncontrolled intersections can be especially challenging if the driver is unfamiliar with the area, trying to follow a routeline provided by a navigation system, and/or trying to avoid other road conditions (e.g., pedestrians, parked cars). The driver may also be distracted by conditions within the vehicle (e.g., passengers, audio system, talking on the phone). Ideally, if the drivers are alerted that cross-traffic does not stop at an intersection, fewer traffic incidents may occur.

Example embodiments are directed to determining uncontrolled intersections, detecting drivers are approaching an uncontrolled intersection on a navigation routeline, and providing warnings to the drivers regarding the approaching uncontrolled intersections. During data analysis time, a network system accesses stored data and analyzes the data to determine the uncontrolled intersections within an area (e.g., a city, a region). In one embodiment, the network system examines third-party data to determine the uncontrolled intersections. The third-party data may comprise, for example, open-source data from a government agency (e.g., from cities) that indicate where stop signs are located. In an alternative embodiment, the network system uses a heuristic approach by analyzing stored trip data from past trips through the area. The past trip data can indicate intersections where, for example, hard stopping, long stop times, and lower speeds (referred to as "features") are detected. Comparing these features with known rules that correlate to stop signs and traffic light, the network system can identify where stop signs are likely located and which intersections are uncontrolled. In some cases, a machine learning model can be trained and used to determine the uncontrolled intersections by applying these features of the model. The uncontrolled intersection data is then integrated with existing map data of the navigation system and stored for use at runtime.

During runtime, the network system provides navigation information including a route to a driver (e.g., user device of the driver). The network system then monitors a location the driver (e.g., monitors the user device of the driver in a vehicle) as the driver traverses a routeline of the route. Because the uncontrolled intersection data is integrated with the map data, the network system will detect when the driver is approaching (e.g., within 100 feet, within 30 meters) an uncontrolled intersection. This detection automatically triggers a warning to be presented to the driver indicating that they are approaching an uncontrolled intersection.

Thus, the present disclosure provides technical solutions for determining uncontrolled intersections and integrating the uncontrolled intersection data with map data. The technical solutions also provide mechanisms to monitor drivers during navigation of routelines, detect drivers approaching uncontrolled intersections, and trigger automatic presentation of user interfaces that include warnings to the drivers. As such, the present disclosure provides a technical solution that addresses safety using navigation systems.

FIG. 1 is a diagram illustrating a network environment 100 suitable for providing an uncontrolled intersection detection and warning system. The network environment 100 includes a network system 102 communicatively coupled via a network 104 to a requester device 106a of a rider and a service provider device 106b of a driver (collectively referred to as "user devices 106"). In example embodiments, the network system 102 comprises components that obtain, store, and analyze data received from the user devices 106. The data (referred to as "trip data") can be analyzed to determine uncontrolled intersections in accordance with some embodiments. Further still, the network system 102 integrates the determined uncontrolled intersection data with map data and uses the integrated map data to provide navigation instructions and trigger warnings. The components of the network system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the network system 102 through a client application 108 stored thereon. The client application 108 of the user devices 106 allow for exchange of information with the network system 102 via user interfaces, as well as in background. For example, the client application 108 running on the user devices 106 may determine and/or provide location information (e.g., current location in latitude and longitude), speed, and times (e.g., timestamps) associated with portions of the trip, via the network 104, for storage and analysis. Further still, the user devices 106 can provide data from an Inertial Measurement Unit (IMU) to the network system 102. In some embodiments, the trip data is used by the network system 102 to train models (or retrain models) and determine uncontrolled intersections.

In example embodiments, a first user (e.g., a requester or rider) operates the requester device 106a that executes the client application 108 to communicate with the network system 102 to make a request for a transportation service such as transport or delivery service (referred to collectively as a "trip"). In some embodiments, the client application 108 determines or allows the first user to specify/select a pickup location (e.g., of the user or an item to be delivered) and to specify a drop-off location or destination for the trip. The client application 108 also presents information, from the network system 102 via user interfaces, to the user of the requester device 106a.

A second user (e.g., a service provider or driver) operates the service provider device 106b to execute the client application 108 that communicates with the network system 102 to exchange information associated with providing transportation service (e.g., to the user of the requester device 106a). The client application 108 presents information via user interfaces to the user of the service provider device 106b, such as invitations to provide the transportation service, navigation instructions (e.g., a route to a pickup point or destination), and notifications, such as uncontrolled intersection warnings. The client application 108 also provides data to the network system 102 such as a current location (e.g., coordinates such as latitude and longitude), speed, heading, and/or times associated with events during navigation by the service provider device 106b or vehicle. While example embodiments discuss the driver being a service provider in a transportation service, alternatively, the driver may be an individual attempting to drive between an origin and a destination and uses example embodiments to navigate to the destination.

A third-party (3P) source 110 comprises components or devices (e.g., server, database) associated with a third party from which the network system 102 accesses data. In various embodiments, the 3P data accessed from the 3P source 110 comprises open-source data from an agency or government department (e.g., a city agency, transportation department) that indicate where stop signs are located within an area. Alternatively, the 3P source 110 may be associated with a private agency that maintains traffic information including locations of stop signs. In example embodiments, the network system 102 accesses the 3P data and uses the 3P data to determine uncontrolled intersections and/or verify uncontrolled intersections determined using heuristic or machine learning approaches performed by the network system 102.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 and 3P sources 110 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the network system 102. While only a single network system 102 is shown, alternative embodiments may contemplate having more than one network system 102 to perform server operations discussed herein for the network system 102.

Figure 2:
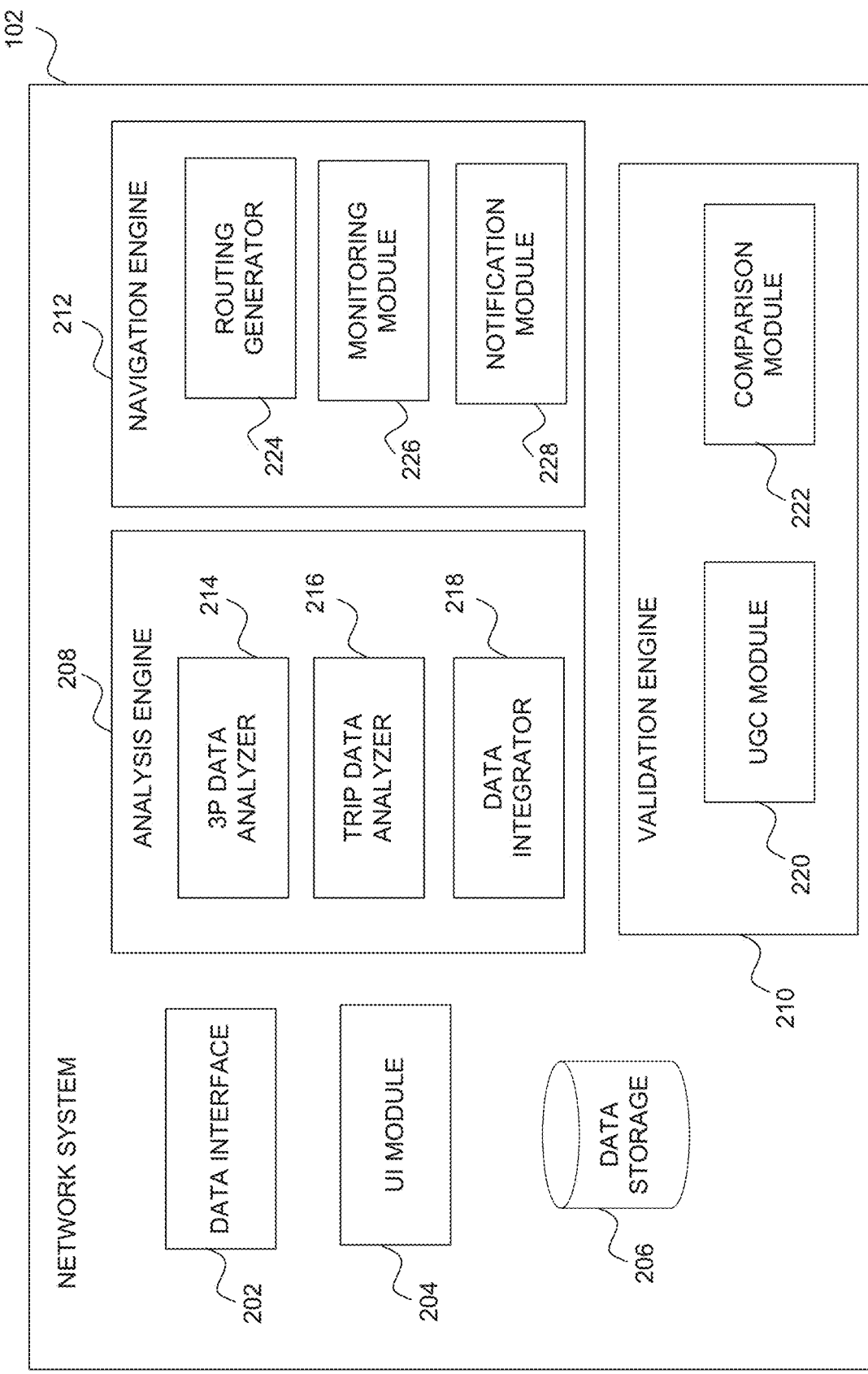
FIG. 2 is a block diagram illustrating components of a network system for detecting uncontrolled intersections and providing warnings, according to example embodiments.

FIG. 2 is a block diagram illustrating components of the network system 102, according to some example embodiments. In various embodiments, the network system 102 obtains and stores trip data (e.g., locations of user devices, speed, direction, timestamps of events) received from the user devices 106 and/or obtains and stores 3P data. The network system 102 then analyzes the trip data and/or the 3P data to determine where stop signs are located (and not located) and thus, where uncontrolled intersections are located. The uncontrolled intersection data is then integrated with map data of the network system. During runtime, the network system 102 provides navigation instructions to a requesting device (e.g., service provider device 106b), monitors the requesting device (and thus monitors a vehicle that the requesting device is traveling within), detects when the requesting device is approaching an uncontrolled intersection, and provides a warning to the requesting device regarding the uncontrolled intersection. To enable these operations, the network system 102 comprises a data interface 202, a user interface (UI) module 204, a data storage 206, an analysis engine 208, a validation engine 210, and a navigation engine 212 all configured to communicate with each other (e.g., via a bus, shared memory, or a switch).

The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The data interface 202 is configured to access data from the 3P source 110, exchange data with the user devices 106, and cause presentation of one or more user interfaces provided by the UI module 204 on the user devices 106 (e.g., via the client application 108) including user interfaces to display a routeline to navigate, navigation instructions, and notifications including uncontrolled intersection warnings. The 3P data may be stored to the data storage 206 by the data interface 202 for later analysis.

The device interface 202 also receives trip data from the user devices 106 before, during, and after a trip. The trip data can include location information such as GPS traces (e.g., latitude and longitude with timestamp), speed, times (e.g., timestamps) associated with events that occur during each trip (e.g., stops at or near intersections), and feedback (e.g., user generated content confirming uncontrolled intersections) from users (e.g., riders or drivers) at the user devices 106. The trip data may be received from the user device 106 in real-time as the user is traveling (or navigating to a destination) during the trip in some cases. The trip data is stored to the data storage 206 by the data interface 202 for later analysis.

The data storage 206 is configured to store information associated with each user of the network system 102 including the trip data. The stored information includes, for example, past trips, saved or frequently selected destinations (e.g., home, work), and user preferences. In some embodiments, the trip data is stored in or associated with a user profile corresponding to each user and includes a history of interactions using the network system 102. While the data storage 206 is shown to be embodied within the network system 102, alternative embodiments can locate the data storage 206 elsewhere and the data storage 206 be communicatively coupled to the network system 102. Furthermore, while only a single data storage 206 is shown in FIG. 2, more than one data storage 206 may be provided. For example, a first data storage can store trip data and user profile data and a second data storage can store 3P data.

The analysis engine 208 is configured to determine uncontrolled intersections. More particularly, the analysis engine 208 analyzes data from the 3P source 110 and/or trip data from the user devices 106 to identify where stop signs are located in an area. For intersections where not every roadway into the intersection has a stop sign, the analysis engine 208 identifies that intersection as an uncontrolled intersection. The uncontrolled intersection data is then integrated with map data used by the network system 102 for providing navigation information. To enable these operations, the analysis engine 208 includes a 3P data analyzer 214, a trip data analyzer 216, and a data integrator 218.

The 3P data analyzer 214 is configured to determine uncontrolled intersections using the 3P data obtained from one or more 3P sources 110. Initially, the 3P data analyzer 214 accesses the 3P data. In some embodiments, the 3P data analyzer 214 accesses, via the data interface 202, the 3P data directly from the 3P source 110. In other embodiments, the 3P analyzer 214 accesses 3P data previously retrieved and stored in the data storage 206. In some cases, the 3P data comprises open-source data from a government agency or department that indicate roadway attributes including where stop lights and stop signs are located within a particular area. The 3P data analyzer 214 then extracts the data regarding locations where the stop signs and, in some cases, stop lights are located. The 3P data analyzer 214 examines the extracted stop sign locations and identifies intersections where not all roadways leading into the intersection have a stop sign. These intersections are classified as uncontrolled intersections. The uncontrolled intersections data is then provided to the data integrator 218.

The trip data analyzer 216 is configured to determine uncontrolled intersections from stored trip data obtained from the user devices 106. The trip data comprises information associated with completed trips that are managed and monitored by the network system 102. In example embodiments, the trip data includes location information such as GPS traces (e.g., latitude and longitude with timestamp), speed at various locations, and timestamps of events that occur during the trip.

The trip data analyzer 216 determines stop sign locations based on traffic patterns derived from the trip data. In example embodiments, the trip data analyzer 216 accesses the trip data for a particular area for a particular duration of time (e.g., 1 month of night trips) from the data storage 206. In one embodiment, the trip data analyzer 216 uses night trips in order to avoid traffic noise. The trip data analyzer 216 may identify stops, stop locations, stop durations, and average speed on roadway segments (e.g., segments approaching each intersection) for every trip.

With respect to the trip data, GPS measurements can be used for rough estimates of distance and speed of an underlying user device. The speed estimation is readily available from velocity fields in GPS measurements or can also be indirectly inferred from changes in latitude and longitude of the GPS measurements.

An alternative for speed estimation is to use the Inertial Measurement Unit (IMU) that contains a set of accelerators and gyroscopes. The set of accelerators is used to estimate a linear acceleration of the user device in a body frame, and the gyroscopes will provide an angular velocity of the user device, again in the body frame. Assuming, for example, the driver's user device is mounted on a phone mount and does not move with respect to the vehicle, the trip data analyzer 216 can use the output of IMU readings from the user device and, after some transformation, projects the movement and the speed of the vehicle.

Because using GPS measurements or IMU readings for determining vehicle movements both have their shortcomings, a hybrid version may be used to a model a vehicle's movement, including estimates of associated physical quantities, such as distance, speed, heading, and accelerations.

Using heuristics and traffic patterns, the trip data analyzer 216 determines which roadways have stop signs (versus stop lights or no stop mechanisms) and which intersections are uncontrolled (e.g., no stop signs or stop lights on at least one roadway of the intersection). For every roadway segment, the trip data analyzer 216 determines a percentage of trips with detected stops, a stop duration distribution, and a speed distribution. The trip data analyzer 216 then analyzes traffic patterns to distinguish between a stop sign and a stop light. For instance, most drivers stop near a stop sign, while a portion of drives do a long stop near a traffic light (e.g., stops a distance from the intersection). With respect to the percentage of trips with detected stops, most trips should show a stop at a stop sign, while a portion (e.g., half) of trips do not stop at a stop light. For stop duration distribution, a stop sign will have relatively short stop durations for all drivers. In contrast, some drivers will stop for a long duration at a stop light, while other drivers do not stop at the stop light. As for speed distribution, the speed distribution should be relatively small for stop signs since all drivers are slowing down to stop. However, the speed distribution will be wide or high for a stop light since some drivers may stop, while other drivers proceed through the stop light without stopping or slowing down when there is a green light.

Once the trip data analyzer 216 identifies the roadways with stop signs and those without, the trip data analyzer 216 can then determine which intersections are uncontrolled. The uncontrolled intersection data is then transmitted to the data integrator 218.

The data integrator 218 is configured to integrate the uncontrolled intersection data with map data of the network system 102. Integration comprises updating the map data used to generate navigation routes with indications of the uncontrolled intersections. Once integrated, warnings for uncontrolled intersections can be automatically triggered for display when the network system 102 detects a driver is approaching an uncontrolled intersection. The integrated map data is then stored for use by the navigation engine 212 at runtime.

While one embodiment of the trip data analyzer 216 uses heuristics and traffic patterns to determine uncontrolled intersections, a further embodiment uses machine learning to determine uncontrolled intersections. For example, a training set of features from known uncontrolled intersections and/or stop sign locations (e.g., from past trip data, from 3P data) can be used to train one or more machine-learning models. Once trained, features can be extracted from new data (e.g., new trip data) and applied to one or more of the learning models to determine uncontrolled intersections or stop sign locations. Further still, features from the new trip data (associated with validated/verified uncontrolled intersections) can subsequently be used to retrain/refine the machine-learning models.

In some embodiments, the uncontrolled intersection data determined by the analysis engine 208 is validated by the validation engine 210. In some cases, the validation is based on feedback from users (e.g., drivers, riders) of the network system 102. Accordingly, a user generated content (UGC) module 220 may generate a user interface that is presented, via the UI module 204, on the user devices 106. The user interface may ask users to verify if there is a stop sign, no stop sign, and/or a stop light at particular intersections. The users can respond to the inquiry and the responses are transmitted back to the UGC module 220. The UGC module 220 can then verify whether an intersection is uncontrolled based on a threshold percentage (e.g., 51%, 55%, 65%) of users confirming the presence or absence of stop signs or stop lights.

Validation of derived uncontrolled intersections by the trip data analyzer 216 can also be performed by a comparison module 222. The comparison module 222 compares the uncontrolled intersections derived by the trip data analyzer 216 against known uncontrolled intersections. In some cases, the known uncontrolled intersections can be the intersections determined by the 3P data analyzer 214. Therefore, the uncontrolled intersection data determined by the trip data analyzer 216 or 3P data analyzer 214 can be compared against uncontrolled intersections data determined by the other analyzer for validation.

The navigation engine 212 manages generating routes, monitoring navigation of the routes, and providing notifications including uncontrolled intersection warnings to drivers. To enable these operations, the navigation engine 212 comprises a routing generator 224, a monitoring module 226, and a notification module 228. The navigation engine 212 may comprise other components (not shown) that are not pertinent to example embodiments.

The routing generator 224 is configured to generate routes from an origin to a destination using any route generation systems or algorithms known to those skilled in the art. In example embodiments, the origin is a starting part of the route. Thus, for example, the origin can be a location of the driver when the driver starts driving or accepts a request to provide transportation service to a rider and the destination is the pickup point of the rider. Alternatively, the route can comprise an origin that is the pickup point of the rider (or item to be delivered) and a destination that is the drop-off point of the rider (or the item). Further still, the route may just be between two locations that a driver wants to travel. In various cases, the generated routes are generated based on, for example, being the fastest, shortest, lowest cost, based on user preferences (e.g., avoid freeways, avoid hills, scenic route, frequently driven route), are frequently driven or selected by other users of the network system 102, or selected by the network system 102 based on other reasons or criteria.

The monitoring module 226 monitors navigation of a routeline of a generated route to the destination. In example embodiments, the monitoring module 226 may receive location information (e.g., GPS coordinates) from the user device 106 (e.g., service provider device 106b) associated with a vehicle navigating the routeline in substantially real-time. Using the GPS information, the monitoring module 226 can identify where on the routeline the user device 106 is located. The monitoring module 226 can then determine whether the user device 106 and thus the driver/vehicle is approaching an uncontrolled intersection. If the driver is approaching an uncontrolled intersection, the monitoring module 226 triggers the notification module 228.

The notification module 228 is configured to provide notifications including warnings to the user devices 106 that they are approaching an uncontrolled intersection. Typically, these warnings are provided to drivers that are approaching an uncontrolled intersection where the drivers will be stopping (as opposed to drivers that are approaching from a roadway without a stop sign). However, in some embodiments, the warnings may also be provided to drivers that are approaching an uncontrolled intersection where they do not have to stop in order to make them aware of cross traffic. The warnings may include a graphical indication on the routeline of an uncontrolled intersection, a textual warning in the navigation instruction portion, and/or an audible/verbal warning. Examples user interfaces displaying different versions of uncontrolled intersection warnings will be discussed in detail in connection with FIG. 6A-FIG. 6F.

In some cases, the warnings may not be presented to the drivers or presented with lower priority. For example, if a critical navigation maneuver is upcoming (e.g., a turn or deviation from the current roadway within a threshold distance), primary navigation instructions associated with the critical navigation maneuver is higher priority and the warning is lower priority. In these cases, the warning may be displayed in a secondary position of the navigation instruction portion (e.g., below the higher priority primary navigation instructions) and/or in a smaller font. However, in some cases, secondary navigation instructions such as lane guidance, address information, or additional information regarding the next maneuver is shown in the secondary portion. In these cases, the warning may not be displayed in the navigation instruction portion.

Figure 3:
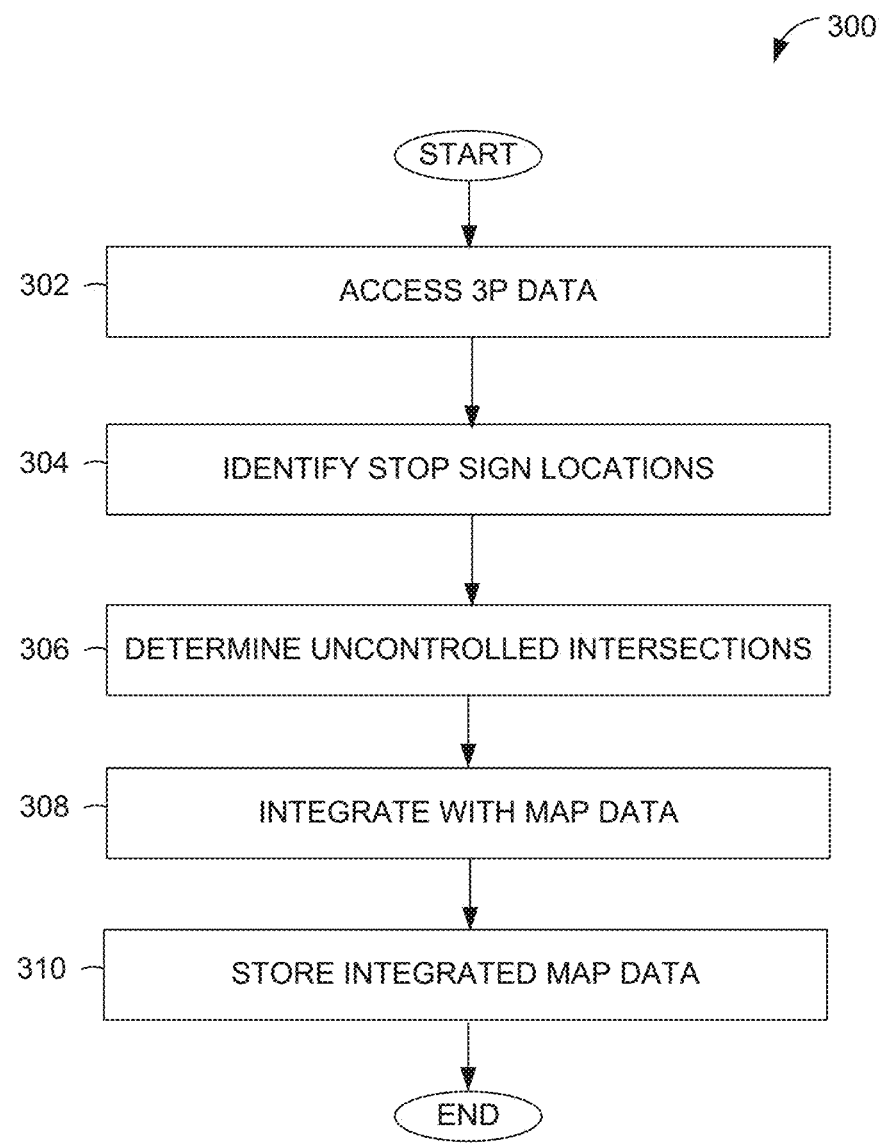
FIG. 3 is a flowchart illustrating operations of a method for generating integrated map data that includes uncontrolled intersection data determined using third party data, according to example embodiments.

FIG. 3 is a flowchart illustrating operations of a method 300 for generating integrated map data that includes uncontrolled intersection data determined using third party data, according to example embodiments. Operations in the method 300 may be performed by the network system 102, using components of the analysis engine 208 described above with respect to FIG. 2. Accordingly, the method 300 is described by way of example with reference to the analysis engine 208. However, it shall be appreciated that at least some of the operations of the method 300 may be deployed on various other hardware configurations or be performed by similar components residing elsewhere in the network environment 100. Therefore, the method 300 is not intended to be limited to the analysis engine 208.

In operation 302, the 3P data analyzer 214 accesses the 3P data. In some embodiments, the 3P data analyzer 214 accesses the 3P data directly from the 3P source 110 via the data interface 202. In other embodiments, the 3P data analyzer 214 accesses the 3P data from the data storage 206. In these cases, the data interface 202 previously obtained and stored the 3P data to the data storage 206 for later processing (e.g., during non-peak hours, when a particular amount of 3P data has been stored).

In operation 304, the 3P data analyzer 214 identifies stop sign locations. The 3P data may comprise open-source data from a government agency or department that indicate roadway attributes including where stop lights and stop signs are located within a particular area. The 3P data analyzer 214 extracts the data regarding where stop signs and stop lights are located.

In operation 306, the 3P data analyzer 214 determines uncontrolled intersections. Here, the 3P data analyzer 214 examines the extracted stop sign and stop light locations and identifies intersections where not all roadways leading into the intersection have a stop sign (or stop light). These intersections are determined to be uncontrolled intersections. The uncontrolled intersection data is then passed to the data integrator 218 by the 3P data analyzer 214.

In operation 308, the data integrator 218 integrates the uncontrolled intersection data with map data of the network system 102. Integration comprises updating the map data used to generate navigation instructions with indications of the uncontrolled intersections.

In operation 310, the data integrator 218 stores the integrated map data. The integrated map data can then be accessed and used by the navigation engine 212 during runtime to generate routes and providing warnings of uncontrolled intersections during navigation of the routes.

Figure 4:
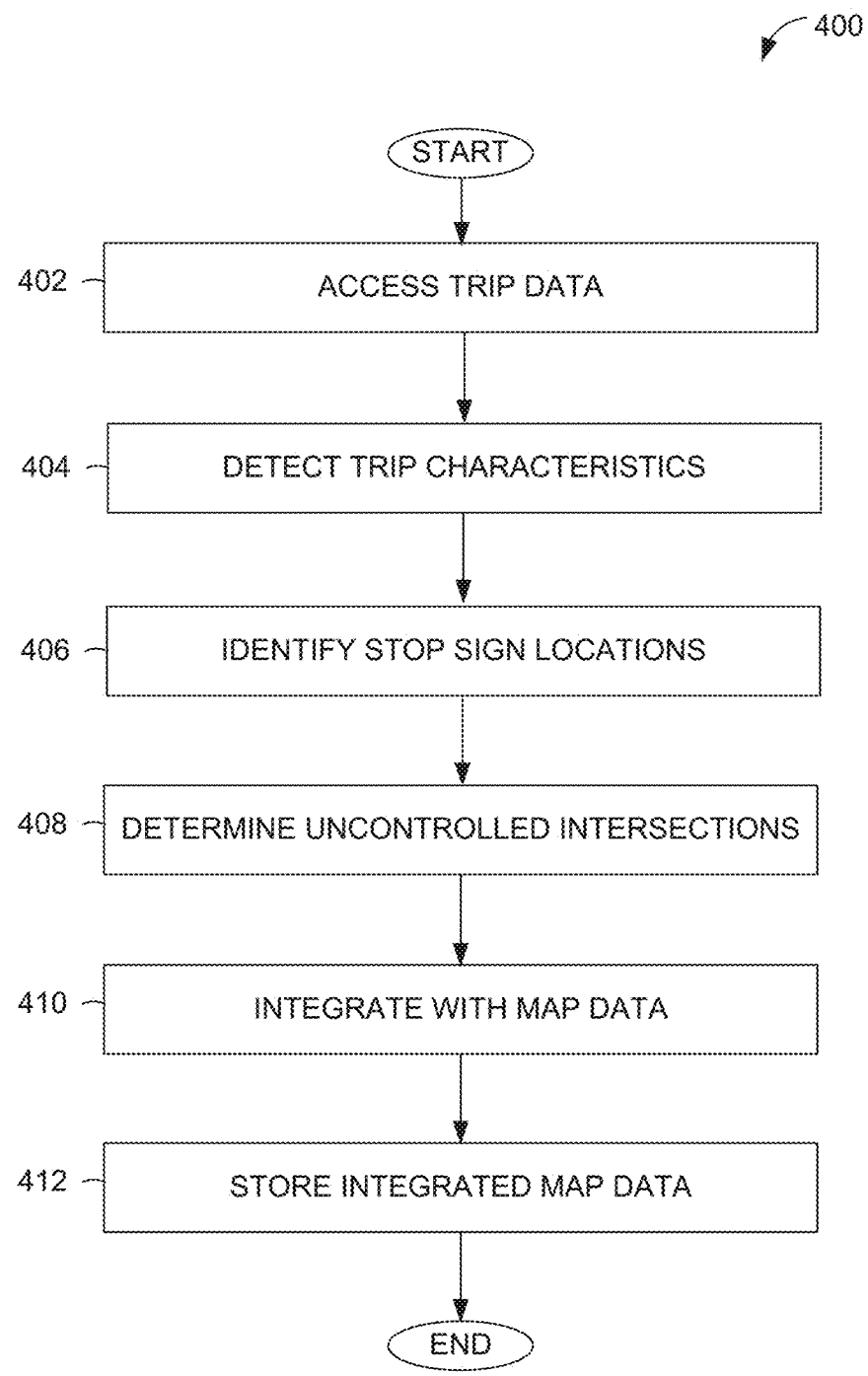
FIG. 4 is a flowchart illustrating operations of a method for generating integrated map data that includes uncontrolled intersection data determined using trip data, according to example embodiments.

FIG. 4 is a flowchart illustrating operations of a method 400 for generating integrated map data that includes uncontrolled intersection data determined using historical trip data, according to example embodiments. Operations in the method 400 may be performed by the network system 102, using components of the analysis engine 208 described above with respect to FIG. 2. Accordingly, the method 400 is described by way of example with reference to the analysis engine 208. However, it shall be appreciated that at least some of the operations of the method 400 may be deployed on various other hardware configurations or be performed by similar components residing elsewhere in the network environment 100. Therefore, the method 400 is not intended to be limited to the analysis engine 208.

In operation 402, the trip data analyzer 216 accesses trip data for a particular area for a particular duration of time. For example, the trip data analyzer 216 may access trip data for trips conducted between certain hours over the last month for a certain region (e.g., city, district, series of neighborhoods). In one embodiment, the trip data analyzer 216 uses trips conducted at night in order to avoid noise from daytime traffic.

In operation 404, the trip data analyzer 216 detects trip characteristics (or features) from the accessed trip data. The trip characteristics include, for example, indications of stops, stop locations, stop durations, and average speed on each roadway segment (e.g., segments approaching each intersection) for every trip.

In operation 406, the trip data analyzer 216 identifies stop sign locations by examining the trip characteristics at each intersection. For every roadway segment, the trip data analyzer 216 may determine a percentage of trips with detected stops, a stop duration distribution, and a speed distribution. The trip data analyzer 216 also analyzes traffic patterns to distinguish between a stop sign and a stop light. For instance, most drivers stop near a stop sign, while a portion of drives do a long stop near a traffic light (e.g., stops a distance from the intersection). With respect to the percentage of trips with detected stops, most trips should show a stop at a stop sign, while a portion (e.g., half) of trips do not stop at a stop light. For stop duration distribution, a stop sign will have relatively short stop durations for all drivers. In contrast, some drivers will stop for a long duration at a stop light, while there may be no stops for other drivers at stop lights. As for speed distribution, the speed distribution should be relatively small for stop signs since all drivers are slowing down to stop. However, the speed distribution will be wide or high for a stop light since some drivers may stop, while other drivers proceed through the stop light without stopping or slowing down when there is a green light. The trip data analyzer 216 weighs all these factors in determining whether a roadway segment includes a stop sign (e.g., versus a stop light) or no roadway control mechanism.

In operation 408, the trip data analyzer 216 determines the uncontrolled intersections. In example embodiments, the trip data analyzer 216 examines the stop sign locations identified in operation 406 and determines intersections where not all roadways leading into the intersection have a stop sign. These intersections are determined to be uncontrolled intersections. The uncontrolled intersection data is then passed to the data integrator 218 by the trip data analyzer 216.

In some embodiments, a machine learning model may be used to identify stop sign locations (operation 406) and/or uncontrolled intersections (operation 408). The features detected in operation 404 are applied to a machine learning model trained on features of known stop sign locations and/or uncontrolled intersections. For example, the machine learning model can identify the stop sign locations and the trip data analyzer 216 subsequently determines the uncontrolled intersection. As an alternative, the features are applied to the machine learning model which identifies and outputs the uncontrolled intersection.

The machine learning model can be trained on features extracted from past trip data associated with stop sign locations and/or uncontrolled intersections that have been validated by the validation engine 210. Additionally or alternatively, the machine learning model can be trained using the 3P data. Furthermore, the machine learning model can be periodically retrained based on new (or newer) trip data and/or 3P data. As road segments may change over time, the retraining ensures that new uncontrolled intersections are identified and previously uncontrolled intersections that are no longer uncontrolled are updated in the map data.

In operation 410, the data integrator 218 integrates the uncontrolled intersection data with map data of the network system 102. Integration comprises updating the map data used to generate navigation instructions with indications of the uncontrolled intersections. The indications trigger a notification of the corresponding uncontrolled intersection to be displayed as users (e.g., drivers associated with service provider devices 106b) approach the uncontrolled intersection.

In operation 412, the data integrator 218 stores the integrated map data. The integrated map data can then be accessed and used by the navigation engine 212 during runtime to generate routes and providing warnings of uncontrolled intersections during navigation of the routes.

Figure 5:
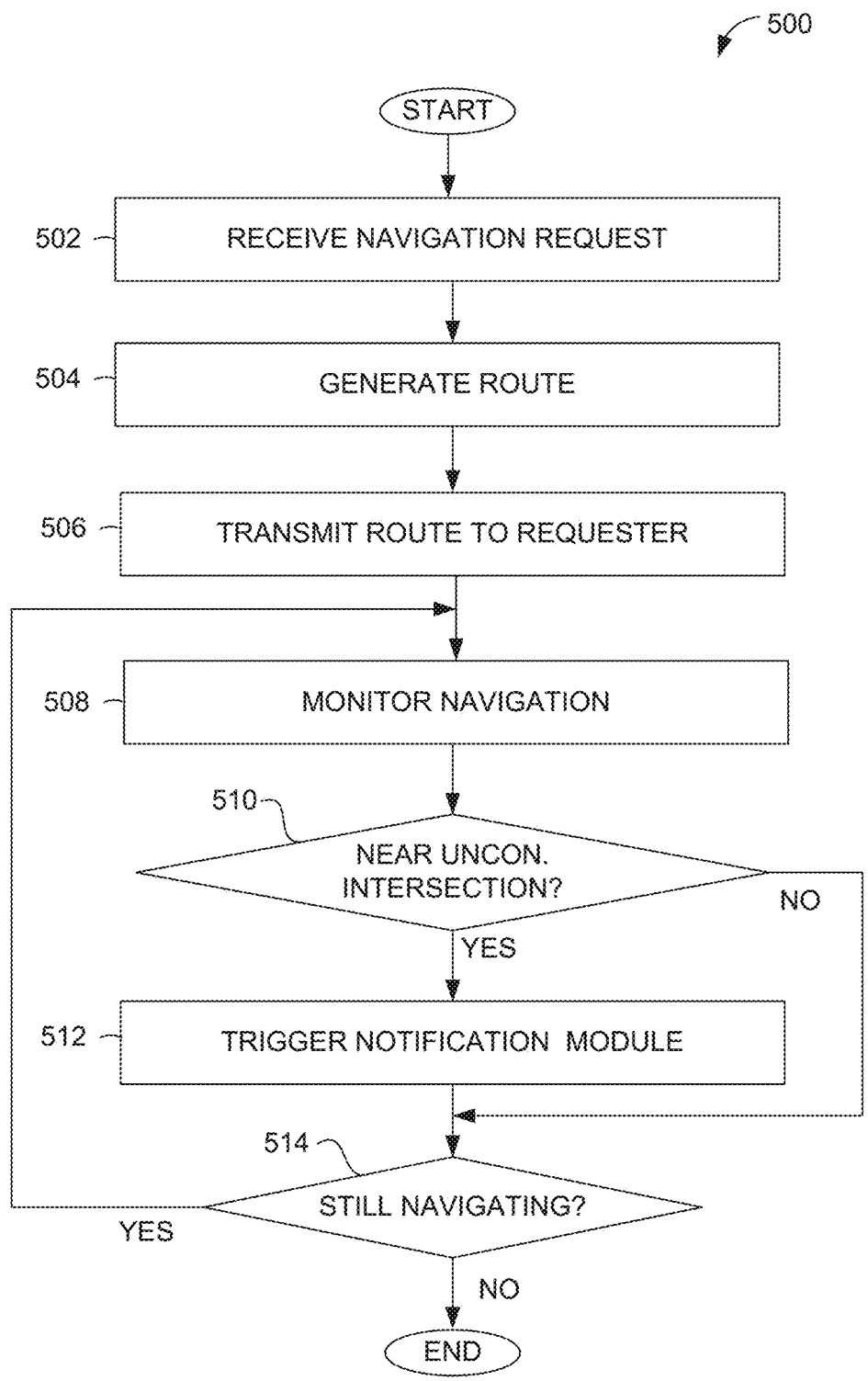
FIG. 5 is a flowchart illustrating operations of a method for providing uncontrolled intersection warnings during navigation, according to example embodiments.

FIG. 5 is a flowchart illustrating operations of a method 500 for providing uncontrolled intersection warnings during navigation, according to some example embodiments. Operations in the method 500 may be performed by the network system 102, using components of the navigation engine 212 described above with respect to FIG. 2. Accordingly, the method 500 is described by way of example with reference to the navigation engine 212. However, it shall be appreciated that at least some of the operations of the method 500 may be deployed on various other hardware configurations or be performed by similar components residing elsewhere in the network environment 100. Therefore, the method 500 is not intended to be limited to the navigation engine 212.

In operation 502, the routing generator 224 receives a navigation request from the user device of a requester (e.g., requester device 106a) or driver (e.g., service provider device 106b). The navigation request includes an indication of an origin and a destination. In a transportation service embodiment, the original may be an initial pickup point selected by the rider or requester and the destination is a drop-off location.

In operation 504, the routing generator 224 generates a route from the origin to the destination. In example embodiments, the generated route is generated based on being the fastest, shortest, lowest cost, based on user preferences (e.g., avoid freeways, avoid hills, scenic route, frequently driven route), are frequently driven or selected by other users of the network system 102, or selected by the network system 102 based on other reasons or criteria.

In operation 506, the routing generator 224 transmits the route to the user device 106 of the requester or driver. Transmitting the route may include providing a user interface via the UI module 204 or providing instructions to generate a user interface at the user device 106, whereby the user interface displays a map of an area and a routeline that the driver is to follow. The driver can then start traversing the routeline.

In operation 508, the monitoring module 226 monitors navigation of a vehicle associated with the user device 106 along the routeline to the destination. In example embodiments, the monitoring module 226 may receive location information (e.g., GPS coordinates) from the user device 106 (e.g., service provider device 106b) in substantially real-time. Using the location information, the monitoring module 226 can identify where on the routeline the driver is located.

In operation 510, the monitoring module 226 determines, using the location information, whether the driver is approaching an uncontrolled intersection. If the driver is approaching an uncontrolled intersection, the monitoring module 226 notifies or triggers the notification module 228 in operation 512. The notification module 228 is configured to provide a warning to the user device (e.g., service provider device 106b of the driver) that they are approaching an uncontrolled intersection. Typically, the warning is provided to a driver approaching an uncontrolled intersection where the driver is on the roadway segment having the stop sign (as opposed to a driver that is approaching from a roadway without a stop sign). However, in some embodiments, the warnings may also be provided to the driver that is approaching an uncontrolled intersection where they do not have to stop in order to warn them to be aware of cross traffic.

Alternatively, if the driver is not near an uncontrolled intersection, then the method 500 proceeds to operation 514 where a determination is made (e.g., by the monitoring module 226) whether the driver is still navigating the route. If the driver is still navigating the route, then the method 500 returns to operation 508 to continue the monitoring.

FIG. 6A-FIG. 6E are example user interfaces displaying different versions of uncontrolled intersection warnings. Each of the user interfaces provides the notification that is triggered in operation 512 when the monitoring module 226 detects that the driver is approaching an uncontrolled intersection and should receive a warning.

Figure 6A:
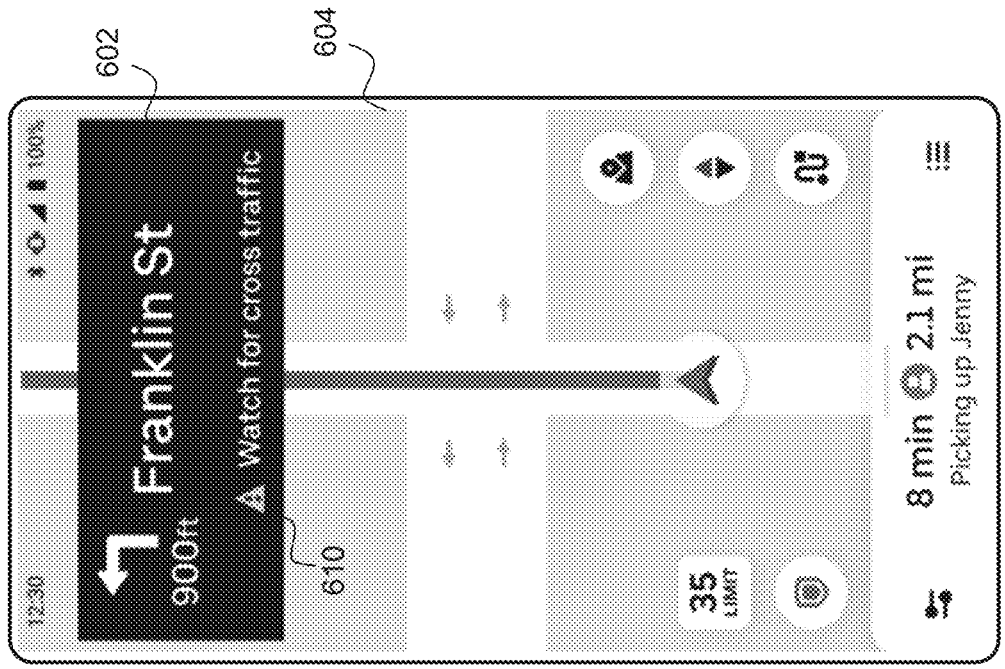
FIG. 6A-FIG. 6E are example user interfaces displaying different versions of uncontrolled intersection warnings, according to example embodiments.

FIG. 6A illustrates one example of a user interface that is provided on the user device (e.g., service provider device 106). As shown, a warning to watch for cross traffic is presented in a navigation instruction portion 602 of the user interface. Because there is a critical navigation maneuver occurring soon (e.g., a left turn in 900 feet), the warning is lower priority. As such, the warning is shown lower in a secondary position and in smaller font than instructions for performing the critical navigation maneuver (e.g., shown in a primary position). Additionally, in a map guidance portion (or graphical portion) 604, a stop sign icon 606 is shown along with a cross-traffic icon 608. In the present example, the cross-traffic icon 608 can indicate to watch for cross traffic and/or that the cross traffic does not stop.

Figure 6B:
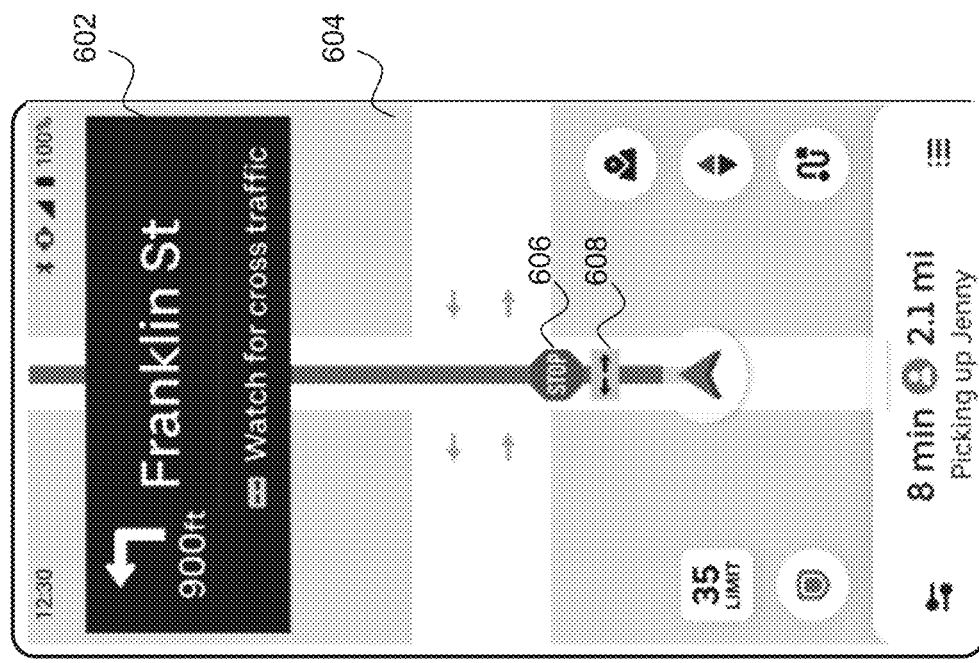

FIG. 6B illustrates a second example of a user interface that is provided on the user device (e.g., service provider device 106). As shown, a warning to watch for cross traffic is presented in the navigation instruction portion 602 of the user interface in a secondary position. Here, a warning icon 610 is used instead of a cross-traffic icon. The example of FIG. 6B minimizes graphics shown in the map guidance portion 604. As such, no stop sign icons or cross-traffic icons are shown.

Figure 6C:
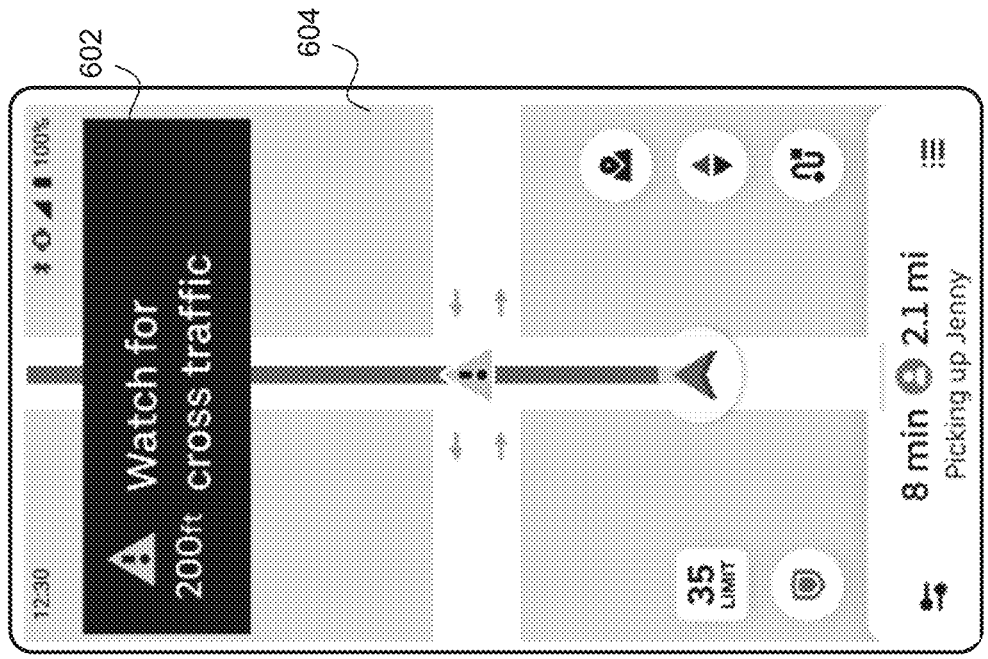

FIG. 6C illustrates a third example of a user interface that is provided on the user device (e.g., service provider device 106). In this example, a warning to watch for cross traffic is presented in the secondary position in the navigation instruction portion 602 of the user interface similar to the first two examples. However, this third example provides a balance between providing multiple icons in the map guidance portion 604 as in FIG. 6A and not showing any icons in the map guidance portion as in FIG. 6B. Here, a warning icon 610 is displayed in the intersection on the map guidance portion 604.

Figure 6D:
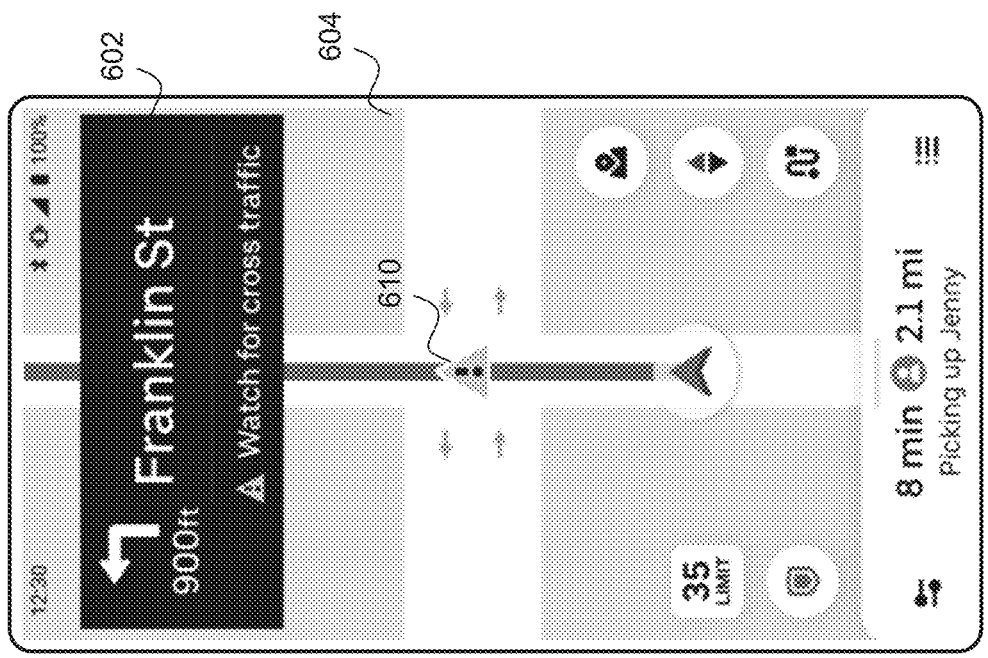

FIG. 6D illustrates a fourth example of a user interface that is provided on the user device (e.g., service provider device 106). In this example, a warning to watch for cross traffic is presented in the primary position in the navigation instruction portion 602 of the user interface since there are no upcoming critical navigation maneuvers. Thus, the warning is shown more prominently and in larger font. Additionally, a distance to the uncontrolled intersection is provided in the navigation instruction portion 602.

Figure 6E:
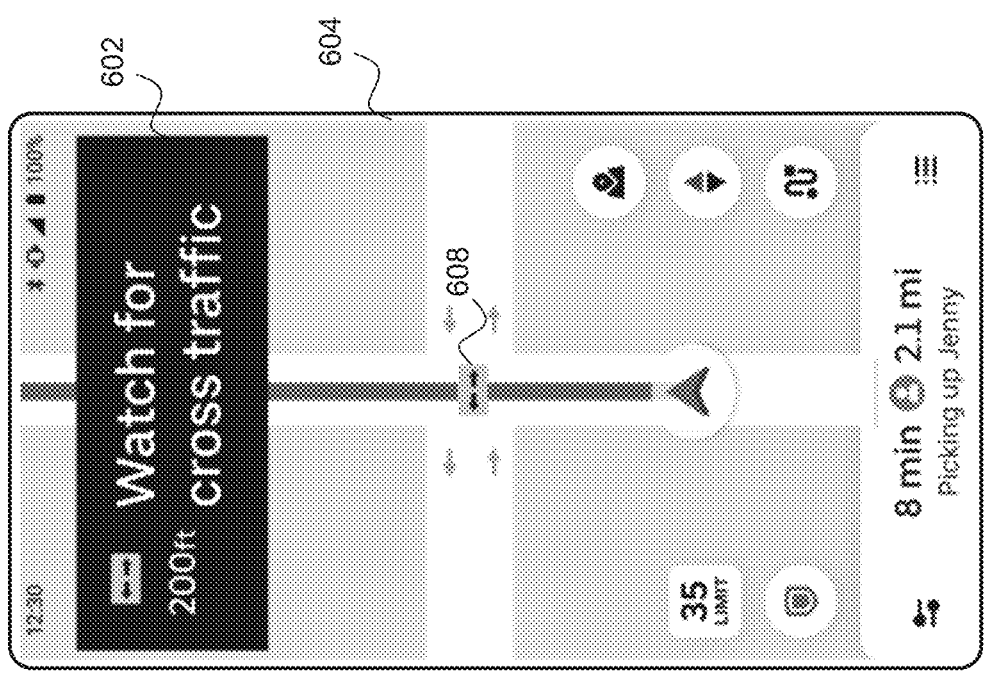

FIG. 6E illustrates a fifth example of a user interface that is provided on the user device (e.g., service provider device 106). In this example, similar to the example of FIG. 6D, a warning to watch for cross traffic is presented in the primary position in the navigation instruction portion 602 of the user interface. However, here the warning icon has been replaced with a cross-traffic icon 608 both in the navigation instruction portion 602 and in the map guidance portion 604.

While the examples of FIG. 6A to FIG. 6E shows various examples of the user interface for providing uncontrolled intersection warnings, example embodiments are not limited to these examples. Other variations of the user interface are contemplated. For example, the warning may comprise other text (e.g., beware of cross traffic, cross traffic does not stop) and other icons can be used to indicate an uncontrolled intersection. Furthermore, verbal/audio warnings can be presented instead of, or in addition to, the visual warnings shown in the above examples.

In some cases, the user interfaces may be displayed to a driver that is approaching an uncontrolled intersection where the driver does not have a stop sign. These user interfaces provide a warning to the driver to be aware of cross traffic and may indicate that the cross traffic should stop.

Figure 7:
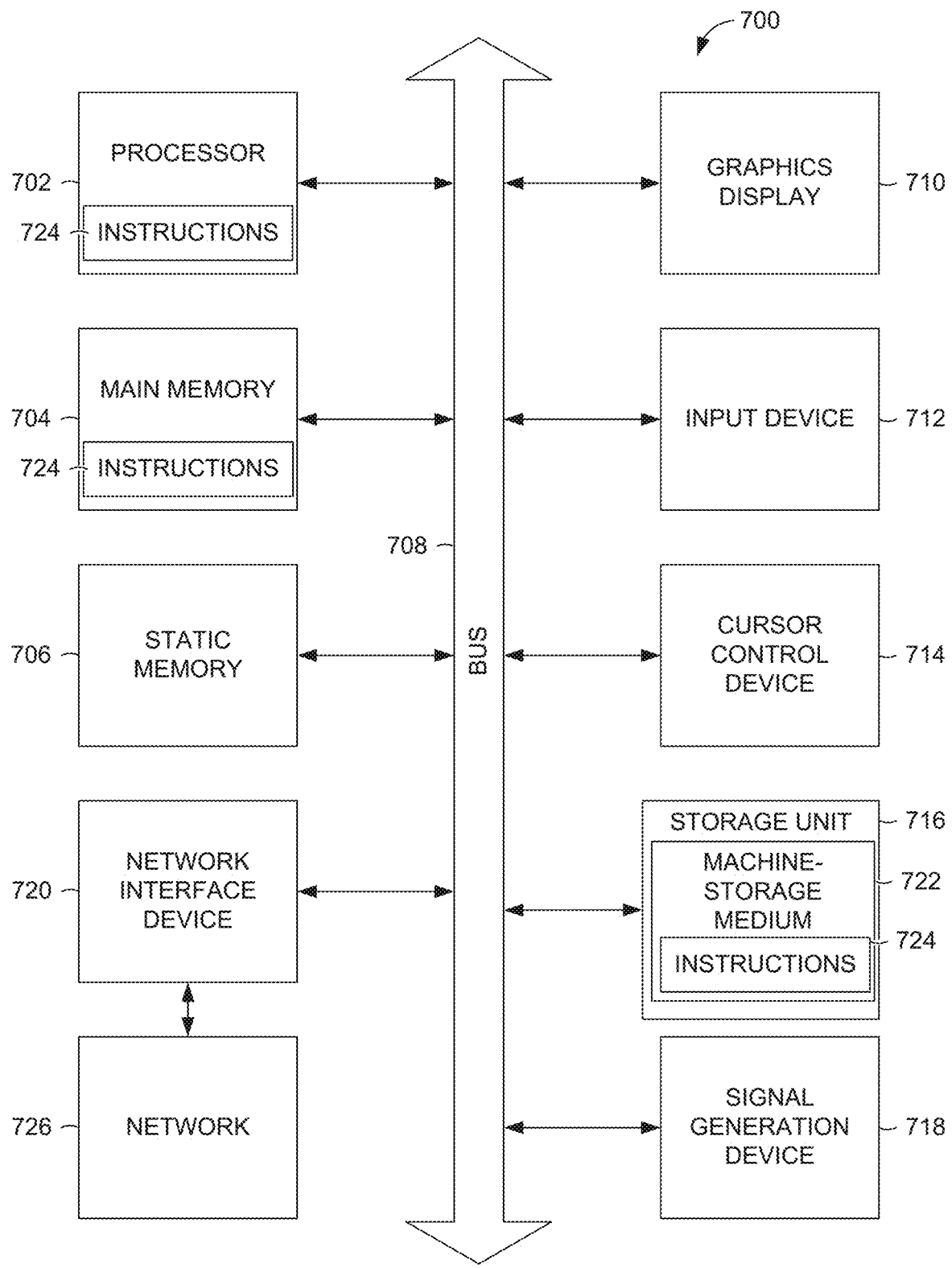
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 3 through FIG. 5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for determining uncontrolled intersections, monitoring navigation of a routeline, and providing a warning to a driver approaching an uncontrolled intersection along the routeline. The method comprises, in response to a navigation request from a user device, generating, by a network system, a navigation route using integrated map data, the integrated map data including indications of uncontrolled intersections that are intersections where at least some of the traffic is not required to stop; causing, by the network system, presentation of the navigation route in a user interface on the user device; monitoring, by the network system, navigation of a vehicle associated with the user device along the navigation route; detecting, by the network system, that the vehicle associated with the user device is approaching an uncontrolled intersection based on the monitoring and the integrated map data; and in response to the detecting, causing presentation of a warning indicating the uncontrolled intersection in the user interface.

In example 2, the subject matter of example 1 can optionally include accessing third-party data that indicates locations of stop signs; identifying stop sign locations from the third-party data; determining the uncontrolled intersections based on the stop sign locations by identifying intersections where not all roadways leading into the intersections have a stop sign; and generating the integrated map data by integrating data regarding the uncontrolled intersections with existing map data.

In example 3, the subject matter of any of examples 1-2 can optionally include accessing trip data from previous completed navigations using navigation routes generated by the network system; detecting trip characteristics from the trip data; based on heuristics and traffic patterns, identifying, for each intersection, stop sign locations based on the trip characteristics; determining uncontrolled intersections based on the stop sign locations by identifying intersections where not all roadways leading into the intersections have a stop sign; and generating the integrated map data by integrating data regarding the uncontrolled intersections with existing map data.

In example 4, the subject matter of any of examples 1-3 can optionally include wherein the identifying based on heuristics and traffic patterns is based on a percentage of trips with detected stops for each intersection.

In example 5, the subject matter of any of examples 1-4 can optionally include wherein the identifying based on heuristics and traffic patterns is based on a stop duration distribution for each intersection.

In example 6, the subject matter of any of examples 1-5 can optionally include wherein the identifying based on heuristics and traffic patterns is based on a speed distribution for each intersection.

In example 7, the subject matter of any of examples 1-6 can optionally include validating the determined uncontrolled intersections, the validating comprising causing presentation of a user interface to a plurality of users of the network system asking the plurality of users to verify whether there is a stop sign or a stop light at a particular intersection; aggregating responses received from the plurality of users; and determining that a threshold percentage of the plurality of users confirms the presence of the stop sign or stop light.

In example 8, the subject matter of any of examples 1-7 can optionally include validating the determined uncontrolled intersections, the validating comprising accessing known uncontrolled intersection data from a third party source; and comparing the determined uncontrolled intersection with the known uncontrolled intersection data.

In example 9, the subject matter of any of examples 1-8 can optionally include accessing trip data from previous completed navigations using navigation routes generated by the network system; detecting trip features from the trip data; applying the trip features to a machine learning model to identify stop sign locations, the uncontrolled intersections being identified from the identified stop sign locations; and generating the integrated map data by integrating data regarding the uncontrolled intersections with existing map data.

In example 10, the subject matter of any of examples 1-9 can optionally include wherein causing presentation of the warning comprises presenting text indicating the warning in a navigation instruction portion of the user interface.

In example 11, the subject matter of any of examples 1-10 can optionally include wherein causing presentation of the warning comprises presenting one or more icons associated with the uncontrolled intersection in a map guidance portion of the user interface.

In example 12, the subject matter of any of examples 1-11 can optionally include wherein causing presentation of the warning further comprises providing a verbal or audio warning.

In example 13, the subject matter of any of examples 1-12 can optionally include training a machine learning model that identifies stop sign locations, the training comprising extracting features from past trip data having validated uncontrolled intersections; and training the machine learning model using the extracted features.

Example 14 is a system that determines uncontrolled intersections, monitors navigation of a routeline, and provides a warning to a driver approaching an uncontrolled intersection along the routeline. The system comprises one or more hardware processors and a memory storing instructions that, when executed by the one or more hardware processors, cause the one or more hardware processors to perform operations comprising, in response to a navigation request from a user device, generating a navigation route using integrated map data, the integrated map data including indications of uncontrolled intersections that are intersections where at least some of the traffic is not required to stop; causing presentation of the navigation route in a user interface on the user device; monitoring navigation of a vehicle associated with the user device along the navigation route; detecting that the vehicle associated with the user device is approaching an uncontrolled intersection based on the monitoring and the integrated map data; and in response to the detecting, causing presentation of a warning indicating the uncontrolled intersection in the user interface.

In example 15, the subject matter of example 14 can optionally include wherein the operations further comprise accessing third-party data that indicates locations of stop signs; identifying stop sign locations from the third-party data; determining the uncontrolled intersections based on the stop sign locations by identifying intersections where not all roadways leading into the intersections have a stop sign; and generating the integrated map data by integrating data regarding the uncontrolled intersections with existing map data.

In example 16, the subject matter of any of examples 14-15 can optionally include wherein the operations further comprise accessing trip data from previous completed navigations using navigation routes generated by a network system; detecting trip characteristics from the trip data; based on heuristics and traffic patterns, identifying, for each intersection, stop sign locations based on the trip characteristics; determining uncontrolled intersections based on the stop sign locations by identifying intersections where not all roadways leading into the intersections have a stop sign; and generating the integrated map data by integrating data regarding the uncontrolled intersections with existing map data.

In example 17, the subject matter of any of examples 14-16 can optionally include wherein the operations further comprise accessing trip data from previous completed navigations using navigation routes generated by a network system; detecting trip features from the trip data; applying the trip features to a machine learning model to identify stop sign locations, the uncontrolled intersections being identified from the identified stop sign locations, and generating the integrated map data by integrating data regarding the uncontrolled intersections with existing map data.

In example 18, the subject matter of any of examples 14-17 can optionally include wherein the operations further comprise training a machine learning model that identifies stop sign locations, the training comprising extracting features from past trip data having validated uncontrolled intersections; and training the machine learning model using the extracted features.

In example 19, the subject matter of any of examples 14-18 can optionally include wherein causing presentation of the warning comprises presenting text indicating the warning in a navigation instruction portion of the user interface; presenting one or more icons associated with the uncontrolled intersection in a map guidance portion of the user interface; or providing a verbal or audio warning.

Example 20 is a computer-storage medium comprising instructions which, when executed by one or more hardware processors of a machine, cause the machine to perform operations for determining uncontrolled intersections, monitoring navigation of a routeline, and providing a warning to a driver approaching an uncontrolled intersection along the routeline. The operations comprise, in response to a navigation request from a user device, generating a navigation route using integrated map data, the integrated map data including indications of uncontrolled intersections that are intersections where at least some of the traffic is not required to stop; causing presentation of the navigation route in a user interface on the user device; monitoring navigation of a vehicle associated with the user device along the navigation route; detecting that the vehicle associated with the user device is approaching an uncontrolled intersection based on the monitoring and the integrated map data; and in response to the detecting, causing presentation of a warning indicating the uncontrolled intersection in the user interface.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    determining uncontrolled intersections based on stop sign locations by identifying intersections where not all roadways leading into the intersections have a stop sign;
    validating the determined uncontrolled intersections based on a threshold percentage of users confirming, via a user interface, an absence of stop signs;
    generating integrated map data by integrating data regarding the validated uncontrolled intersections with existing map data, the integrated map data including indications of the uncontrolled intersections where at least some traffic is not required to stop;
    in response to a navigation request from a user device, generating, by a network system, a navigation route using integrated map data, the integrated map data including indications of uncontrolled intersections that are intersections where at least some of the traffic is not required to stop;
    causing, by the network system, presentation of the navigation route in a user interface on the user device;
    monitoring, by the network system, navigation of a vehicle associated with the user device along the navigation route;
    based on the monitoring and the integrated map data, detecting, by the network system, that the vehicle associated with the user device is approaching an uncontrolled intersection; and
    in response to the detecting, causing presentation, in the user interface, of a warning that indicates the uncontrolled intersection and to watch for the cross-traffic.

2. The method of claim 1, wherein determining the uncontrolled intersections comprises:
    accessing third-party data that indicates stop sign locations; and
    identifying the stop sign locations from the third-party data.

3. The method of claim 1, wherein determining the uncontrolled intersections comprises:
    accessing trip data from previous completed navigations using navigation routes generated by the network system;
    detecting trip characteristics from the trip data; and
    based on heuristics and traffic patterns, identifying, for each intersection, stop sign locations based on the trip characteristics.

4. The method of claim 3, wherein the identifying based on heuristics and traffic patterns is based on a percentage of trips with detected stops for each intersection.

5. The method of claim 3, wherein the identifying based on heuristics and traffic patterns is based on a stop duration distribution for each intersection.

6. The method of claim 3, wherein the identifying based on heuristics and traffic patterns is based on a speed distribution for each intersection.

7. The method of claim 1, wherein validating the determined uncontrolled intersections comprises:
causing presentation of the user interface to a plurality of users of the network system asking the plurality of users to verify whether there is a stop sign or a stop light at a particular intersection;
aggregating responses received from the plurality of users via the user interface; and
determining, based on the responses, that the threshold percentage of users confirms the absence of the stop sign or stop light.

8. The method of claim 1, wherein validating further comprises:
accessing known uncontrolled intersection data from a third party source; and
comparing the determined uncontrolled intersection with the known uncontrolled intersection data.

9. The method of claim 1, wherein determining the uncontrolled intersection comprises:
accessing trip data from previous completed navigations using navigation routes generated by the network system;
detecting trip features from the trip data; and
applying the trip features to a machine learning model to identify stop sign locations, the uncontrolled intersections being identified from the identified stop sign locations.

10. The method of claim 1, wherein the warning comprises text to watch for the cross-traffic presented in a navigation instruction portion of the user interface.

11. The method of claim 1, wherein the warning comprises one or more icons associated with the uncontrolled intersection presented in a map guidance portion of the user interface.

12. The method of claim 1, wherein causing presentation of the warning further comprises providing a verbal or audio warning.

13. The method of claim 1, further comprising training a machine learning model that identifies stop sign locations, the training comprising:
extracting features from past trip data having validated uncontrolled intersections; and
training the machine learning model using the extracted features.

14. A system comprising:
one or more hardware processors; and
memory storing instructions that, when executed by the one or more hardware processors, cause the one or more hardware processors to perform operations comprising:
determining uncontrolled intersections based on stop sign locations by identifying intersections where not all roadways leading into the intersections have a stop sign;
validating the determined uncontrolled intersections based on a threshold percentage of users confirming, via a user interface, an absence of stop signs;
generating integrated map data by integrating data regarding the validated uncontrolled intersections with existing map data, the integrated map data including indications of the uncontrolled intersections where at least some traffic is not required to stop;
in response to a navigation request from a user device, generating a navigation route using integrated map data, the integrated map data including indications of uncontrolled intersections that are intersections where at least some of the traffic is not required to stop;
causing presentation of the navigation route in a user interface on the user device;
monitoring navigation of a vehicle associated with the user device along the navigation route;
based on the monitoring and the integrated map data, detecting that the vehicle associated with the user device is approaching an uncontrolled intersection; and
in response to the detecting, causing presentation, in the user interface, of a warning that indicates the uncontrolled intersection and to watch for the cross-traffic.

15. The system of claim 14, wherein determining the uncontrolled intersections comprises:
accessing third-party data that indicates stop sign locations; and
identifying the stop sign locations from the third-party data.

16. The system of claim 14, wherein determining the uncontrolled intersections comprises:
accessing trip data from previous completed navigations using navigation routes generated by a network system;
detecting trip characteristics from the trip data; and
based on heuristics and traffic patterns, identifying, for each intersection, stop sign locations based on the trip characteristics.

17. The system of claim 14, wherein determining the uncontrolled intersections comprises:
accessing trip data from previous completed navigations using navigation routes generated by a network system;
detecting trip features from the trip data; and
applying the trip features to a machine learning model to identify stop sign locations, the uncontrolled intersections being identified from the identified stop sign locations.

18. The system of claim 14, wherein the operations further comprise training a machine learning model that identifies stop sign locations, the training comprising:
extracting features from past trip data having validated uncontrolled intersections; and
training the machine learning model using the extracted features.

19. The system of claim 14, wherein causing presentation of the warning further comprises:
providing a verbal or audio warning.

20. A machine-storage medium storing instructions that, when executed by one or more hardware processors of a machine, cause the machine to perform operations comprising:
determining uncontrolled intersections based on stop sign locations by identifying intersections where not all roadways leading into the intersections have a stop sign;
validating the determined uncontrolled intersections based on a threshold percentage of users confirming, via a user interface, an absence of stop signs;

generating integrated map data by integrating data regarding the validated uncontrolled intersections with existing map data, the integrated map data including indications of the uncontrolled intersections where at least some traffic is not required to stop;

in response to a navigation request from a user device, generating a navigation route using integrated map data, the integrated map data including indications of uncontrolled intersections that are intersections where at least some of the traffic is not required to stop;

causing presentation of the navigation route in a user interface on the user device;

monitoring navigation of a vehicle associated with the user device along the navigation route;

based on the monitoring and the integrated map data, detecting that the vehicle associated with the user device is approaching an uncontrolled intersection; and in response to the detecting, causing presentation, in the user interface, of a warning that indicates the uncontrolled intersection and to watch for the cross-traffic.

* * * * *